(12) United States Patent
Bernardini et al.

(10) Patent No.: US 12,501,880 B2
(45) Date of Patent: Dec. 23, 2025

(54) LIQUID DISPENSER FOR WATERING ANIMALS

(71) Applicant: TECNIPLAST S.P.A., Buguggiate (IT)

(72) Inventors: Pietro Bernardini, Casciago (IT);
Mario Banfi, Cassano Magnago (IT);
Giovanni Malnati, Malnate (IT);
Alessandro Rigamonti, Gallarate (IT);
Marco Giovanni Antonio Brocca,
Tadate (IT)

(73) Assignee: TECNIPLAST S.P.A., Buguggiate (IT)

( * ) Notice: Subject to any disclaimer, the term of this patent is extended or adjusted under 35 U.S.C. 154(b) by 182 days.

(21) Appl. No.: 18/371,075

(22) Filed: Sep. 21, 2023

(65) Prior Publication Data
US 2024/0099264 A1    Mar. 28, 2024

(30) Foreign Application Priority Data

Sep. 23, 2022   (IT) .................. 102022000019542

(51) Int. Cl.
*A01K 1/03*    (2006.01)
*A01K 7/06*    (2006.01)

(52) U.S. Cl.
CPC ............... *A01K 7/06* (2013.01); *A01K 1/031* (2013.01)

(58) Field of Classification Search
CPC ............ A01K 1/035; A01K 39/0213; A01K 9/00–005; A01K 7/02–06; A01K 1/031; A01K 39/00; A01K 1/0356; A01K 1/005; A01K 1/17; A01K 1/06; F16K 15/033; F16K 21/04; F16L 37/0982; F16L 37/098; F16L 37/0985

USPC ..... 137/613–614.6, 798; 251/149–149.9, 12, 251/339, 336, 324; 119/72.5, 72, 75; 285/322, 324

See application file for complete search history.

(56) References Cited

U.S. PATENT DOCUMENTS

| | | | | |
|---|---|---|---|---|
| 4,250,348 A | * | 2/1981 | Kitagawa | F16L 5/06 285/322 |
| 5,407,236 A | * | 4/1995 | Schwarz | F16L 37/098 285/23 |
| 5,927,892 A | * | 7/1999 | Teh-Tsung | H02G 3/0675 403/259 |

(Continued)

FOREIGN PATENT DOCUMENTS

| WO | 88/04888 A1 | 7/1988 |
|---|---|---|
| WO | 2019/244058 A1 | 12/2019 |

*Primary Examiner* — Craig J Price
(74) *Attorney, Agent, or Firm* — Troutman Pepper Locke LLP (57) ABSTRACT

Liquid dispenser which comprises a main body including a main duct, wherein an animal can drink, from the front side of the liquid dispenser, liquids dispensed through the main duct, wherein a stem is arranged in the main duct and comprises a head urged by an helical spring towards the main duct, wherein an auxiliary body is fixed to the main body and includes an auxiliary duct, wherein the head of the stem and the helical spring are arranged in a chamber which connects the main and auxiliary ducts, wherein the auxiliary body is fixed to the main body by extensions engaged with protuberances to prevent reciprocal axial movements between the main body and the auxiliary body, and a locking element is fixed to the main body and/or to the auxiliary body to prevent mutual rotations around the longitudinal axis of the main body with respect to the auxiliary body.

20 Claims, 6 Drawing Sheets

(56) References Cited

U.S. PATENT DOCUMENTS

| | | | |
|---|---|---|---|
| 6,478,343 B2 * | 11/2002 | King Lee | F16L 19/005 |
| | | | 285/86 |
| 9,283,344 B2 * | 3/2016 | Sheffer | F16L 37/0982 |
| 9,433,190 B2 * | 9/2016 | Johnson | A01K 7/06 |
| 9,457,370 B2 * | 10/2016 | Prociw | B05B 15/18 |
| 9,732,882 B2 * | 8/2017 | Gabriel | A01K 7/00 |
| 9,814,213 B1 * | 11/2017 | Lane | A01K 7/06 |
| 10,238,086 B2 | 3/2019 | Gabriel et al. | |
| 10,716,293 B1 * | 7/2020 | Lane | A01K 7/06 |
| 11,399,515 B2 * | 8/2022 | Bernardini | A01K 7/06 |
| 11,484,009 B2 * | 11/2022 | McAdams | A01K 7/06 |
| 11,498,087 B2 * | 11/2022 | Turner | B05B 7/2472 |
| 11,603,948 B2 * | 3/2023 | Halstead | A01K 7/06 |
| 11,746,941 B2 * | 9/2023 | Search | F16L 37/1215 |
| | | | 285/305 |
| 11,974,554 B2 * | 5/2024 | Bernardini | A01K 7/02 |
| 12,222,057 B2 * | 2/2025 | Kern | F16L 37/091 |
| 2006/0032454 A1 | 2/2006 | Gabriel et al. | |

* cited by examiner

LIQUID DISPENSER FOR WATERING ANIMALS

CROSS-REFERENCE TO RELATED APPLICATION

This application claims priority of Italian Application No. 102022000019542, filed Sep. 23, 2022, which is hereby incorporated by reference in its entirety.

TECHNICAL FIELD

The present description relates to a liquid dispenser, in particular a liquid dispenser which can be used to water animals, for example laboratory animals such as small rodents or the like.

BACKGROUND OF THE DESCRIPTION

WO 2019/244058 A1 discloses a liquid dispenser for watering animals, which comprises a stem which is arranged in a main duct of a main body and which comprises a head urged by an elastic ring against a main gasket in a seat of the main body to act as a plug for a valve which can be operated by the stem, when a front end thereof protruding from the main body is displaced by an animal for drinking. An auxiliary body is screwed to the main body and forms with this a chamber which houses the elastic ring, the head of the stem and the main gasket. This known dispenser also includes a diaphragm which is disposed around the stem to protect the main duct from foreign particles and to return the stem to position after it has been moved. However, when the auxiliary body of this known dispenser is screwed to the main body during assembly, some particles may detach from the threads and then contaminate the liquids flowing through the dispenser.

To avoid this problem, U.S. Ser. No. 10/238,086 B2 discloses a liquid dispenser in which the auxiliary body is fixed to the main body by means of teeth which protrude radially from a front portion of the auxiliary body and are snapped into openings made in the inner surface of a housing of the main body for this front portion. This known dispenser also comprises a quick coupling screwed to the auxiliary body, a cylindrical helical spring which urges the stem head towards the main duct and a filter inserted into the auxiliary duct from the rear part of the dispenser. Said coupling allows the dispenser to be fixed to a complementary coupling of a system for watering animals contained in laboratory cages. However, the snap fastening mechanism of this known dispenser does not allow stable and precise fastening of the auxiliary body to the main body, with consequent problems of reliability and liquid tightness over time.

SUMMARY OF THE DESCRIPTION

The object of the present description is therefore to provide a dispenser free from said problems. Said object is achieved with a dispenser, the main characteristics of which are specified in the attached claims, to be considered an integral part of the present description.

Thanks to the particular structures of the main body, of the auxiliary body and of the locking element, the dispenser according to the present description can be assembled and also disassembled in a simple and rapid manner, without releasing particles which would contaminate the liquids, and in a more stable and resistant manner compared to the dispenser of U.S. Ser. No. 10/238,086 B2.

In particular, the extensions and protuberances, with the channels and notches arranged between them, allow the auxiliary body to be fixed to the main body by means of a snap fastening and/or by means of a fastening with reciprocal movements, first axial and then rotary, of the auxiliary body with respect to the main body, or vice versa, so that it is possible to minimize the dimensional tolerances and therefore relative movements, even minimal, of the components of the dispenser after their fastening.

The particular structure of the dispenser also allows the auxiliary body to be made in one piece with a quick coupling that protrudes from the rear side of the dispenser, so as to reduce or even avoid the use of threaded fasteners, which may release material particles.

The dispenser preferably comprises a particular frusto-conical helical spring which concentrates its thrust towards the center of the stem, so as to reduce the force which straightens the stem and therefore the effort required by the animal to counteract this force to drink, without worsening the liquid tightness of the dispenser. The stem is preferably inserted with interference and rigidly at the front end in the helical spring, so that the spring applies on the stem not only an axial force but also a torque which tends to align the stem with the longitudinal axis of the dispenser. This particular spring can advantageously be used also in other dispensers, for example in known dispensers.

The dispenser preferably comprises a particular membrane with openings, which makes it possible to reduce the force which straightens the stem and therefore the effort required by the animal to counteract this force in order to drink, without worsening the liquid tightness of the membrane. This particular membrane can advantageously be used also in other dispensers, for example in known dispensers.

The dispenser preferably comprises a particular main gasket with a plurality of recesses which reduce the contact surfaces between this gasket and the stem, and therefore the risk of blockage in the event of swelling due to chemical substances, without worsening the liquid tightness of the main gasket, so as to improve the reliability of the dispenser over time. This particular gasket can advantageously be used also in other dispensers, for example in known dispensers.

In an alternative embodiment of the dispenser, the main gasket has a particular structure which can be molded on the head of the stem, so as to optimize the liquid tightness of the dispenser and simplify its assembly. This particular gasket can advantageously be used also in other dispensers, for example in known dispensers.

Preferably, the dispenser components are substantially coaxial and/or substantially symmetrical or parallel with respect to the longitudinal axis of the dispenser, so as to simplify their manufacture, especially if molded in plastic material, and/or their assembly.

Thanks to the aforementioned structural characteristics, the dispenser also has a better liquid tightness compared to known dispensers, so as to minimize or even eliminate leaks of liquids from the dispenser.

BRIEF DESCRIPTION OF THE DRAWINGS

Further advantages and characteristics of the dispenser according to the present description will become apparent to those skilled in the art from the following detailed description of some embodiments, to be considered non-limiting examples of the claims, with reference to the attached drawings in which:

EXEMPLARY EMBODIMENTS

As shown in FIGS. 1-11, a first embodiment of the liquid dispenser for watering animals comprises a main body 1 which includes a main duct 2 for allowing a flow of liquids towards a front side of the dispenser, from which front side an animal can be watered with the liquids dispensed through the main duct 2. The main body 1 extends along a longitudinal axis A from a rear side to the front side of the dispenser. A stem 3 is arranged in the main duct 2 and comprises a head 3a, in particular having a substantially flat and/or annular shape, urged by elastic means 6 towards a mouth 2a of the main duct 2, so that the head 3a acts as a plug of a valve, namely it prevents, limits or allows the flow of liquids in the main duct 2 according to the position of the stem 3, which acts as the control member of this valve. For this purpose, a front end 3b of the stem 3 protrudes from the main duct 2, so that the stem can be moved, for example by an animal, in axial and/or radial directions (shown by the arrows in FIG. 2), thus to overcome the thrust of the elastic means 6 and allow or increase the flow of liquids in the main duct 2. A main gasket 4 can be arranged between the head 3a of the stem 3 and the mouth 2a of the main duct 2, so as to obtain a liquid tightness between the head 3a and the main body 1 when the head 3a is urged by the elastic means 6 towards the main duct 2.

Figure 1:
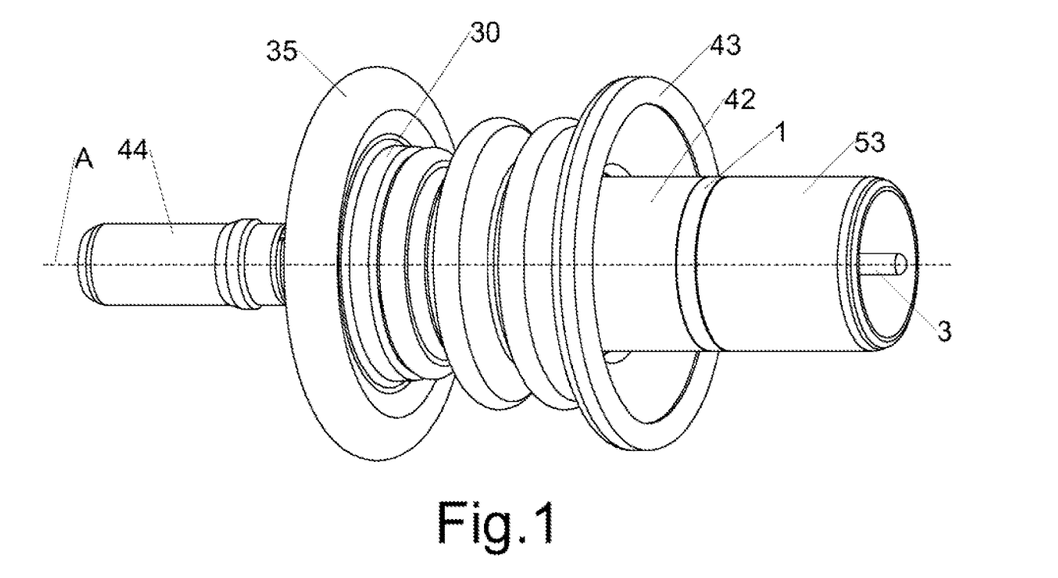
FIG. 1 is an axonometric view of a first embodiment of the dispenser.
Figure 2:
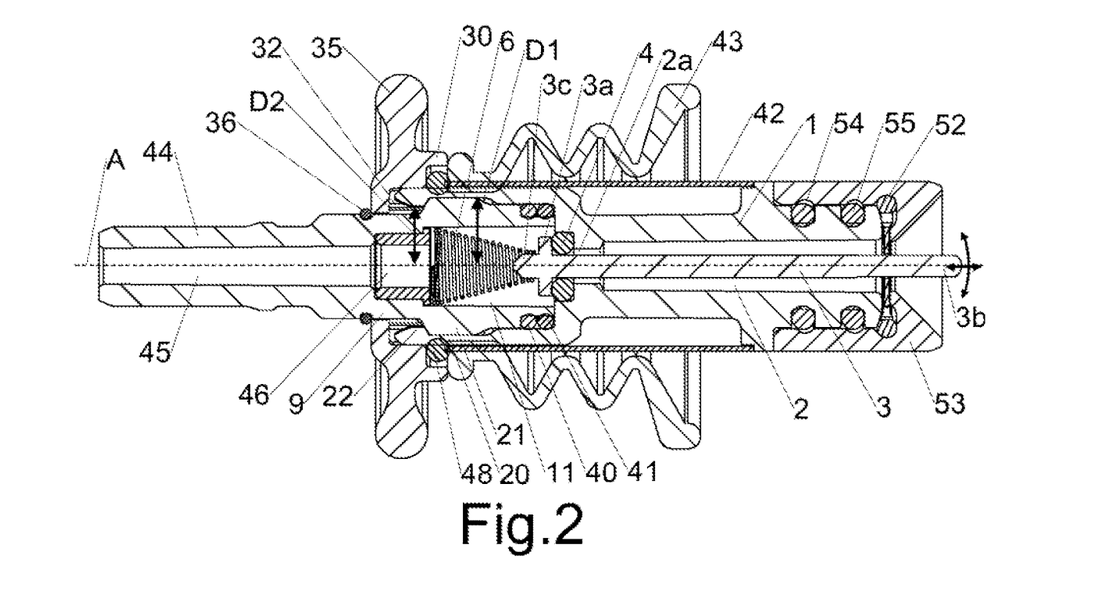
FIG. 2 is a longitudinal sectional view of the dispenser of FIG. 1.
Figure 3:
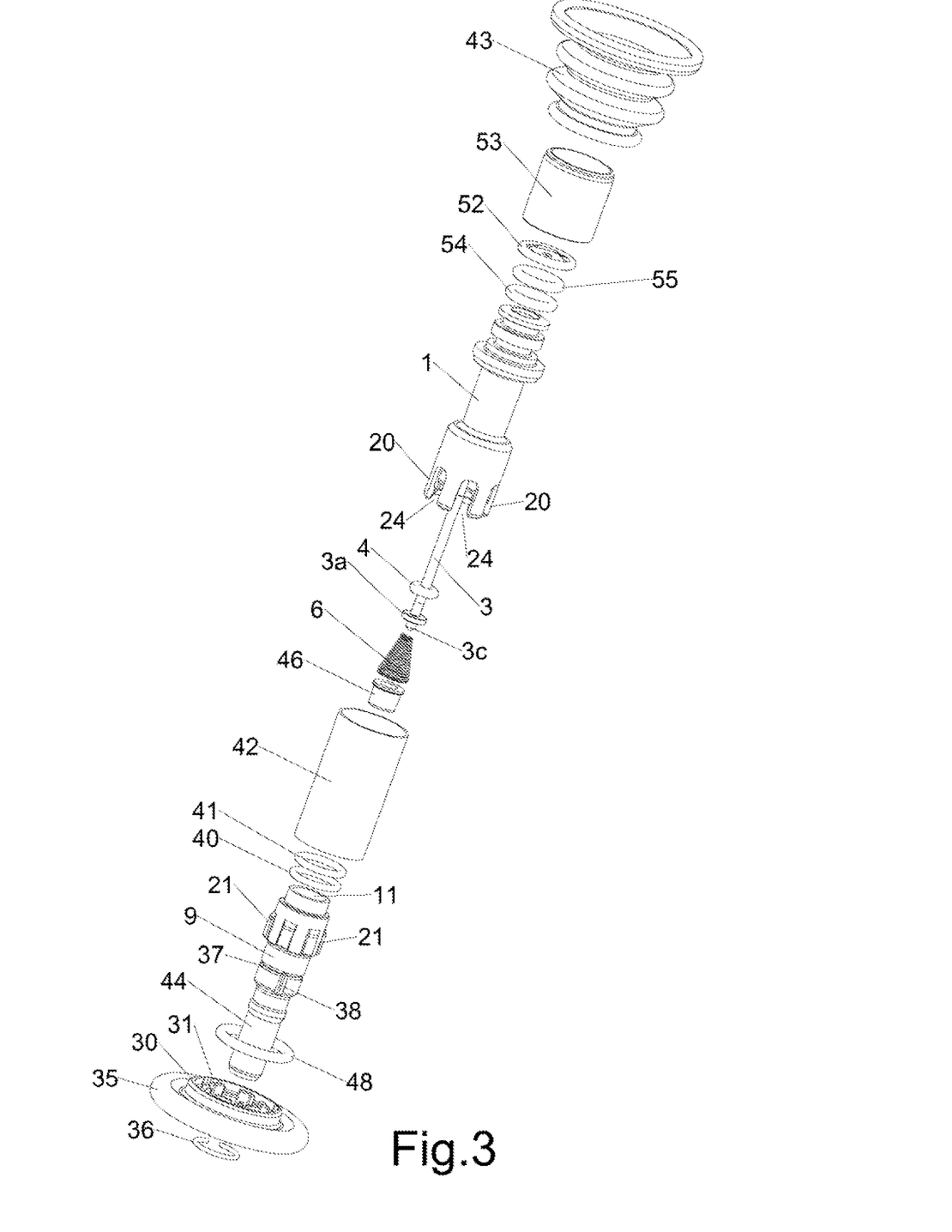
FIG. 3 is an exploded view of the dispenser of FIG. 1.
Figure 4:
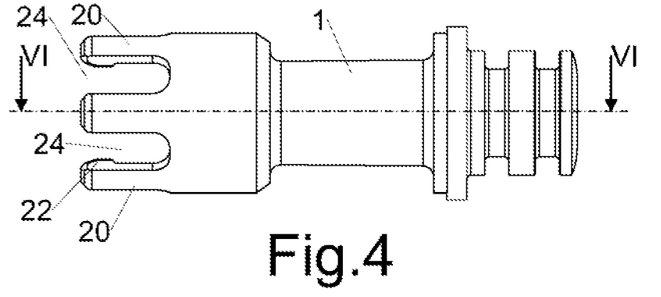
FIG. 4 is a top view of the main body of the dispenser of FIG. 1.
Figure 5:
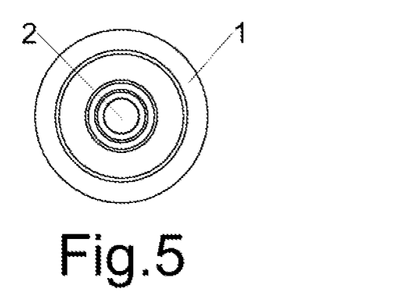
FIG. 5 is a front view of the main body of FIG. 4.
Figure 6:
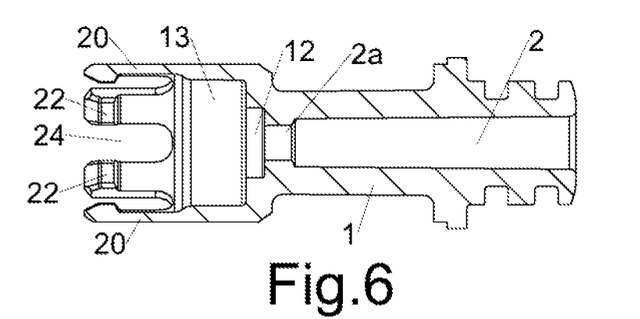
FIG. 6 is the section VI-VI of FIG. 4.
Figure 7:
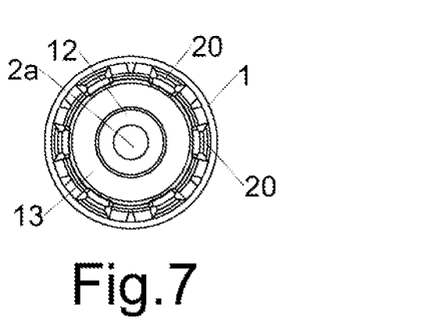
FIG. 7 is a rear view of the main body of FIG. 4.
Figure 8:
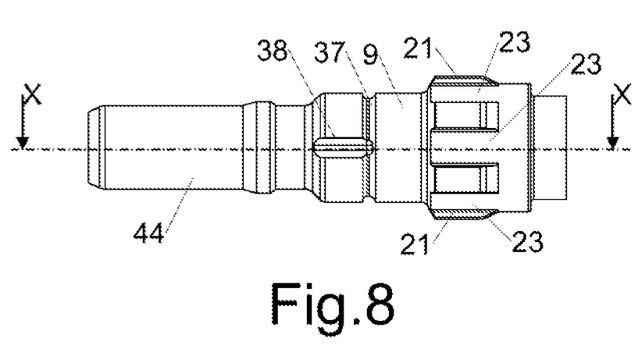
FIG. 8 is a top view of the auxiliary body of the dispenser of FIG. 1.
Figure 9:
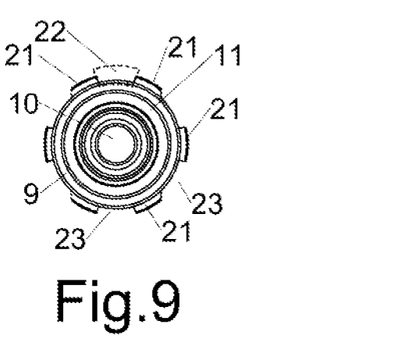
FIG. 9 is a front view of the auxiliary body of FIG. 8.
Figure 10:
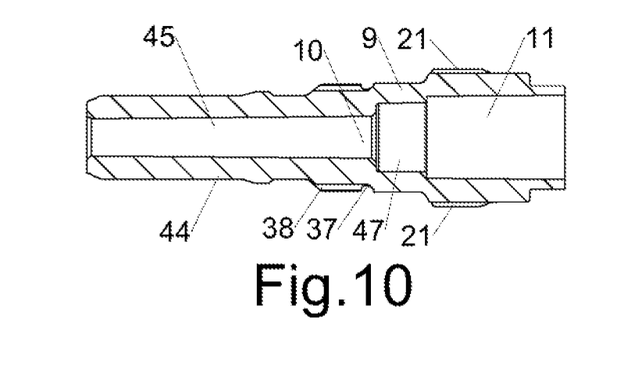
FIG. 10 is the section X-X of FIG. 8.
Figure 11:
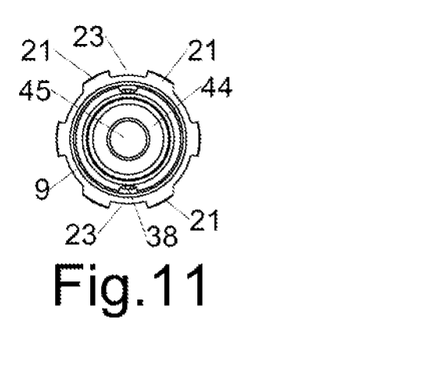
FIG. 11 is a rear view of the auxiliary body of FIG. 8.
Figure 12:
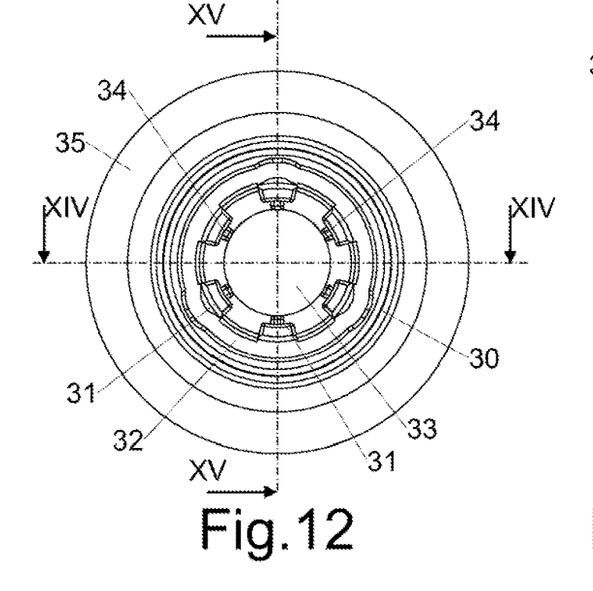
FIG. 12 is a front view of the connection element of the dispenser of FIG. 1.
Figure 13:
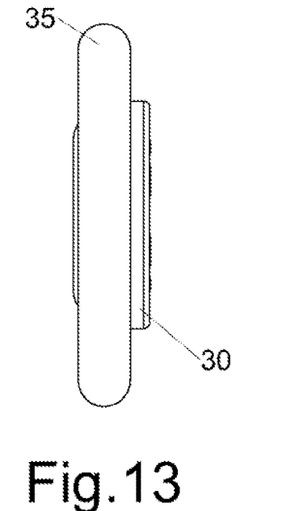
FIG. 13 is a side view of the connection element of FIG. 12.
Figure 14:
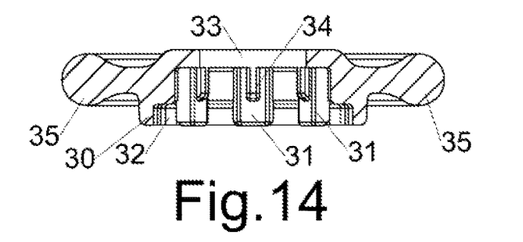
FIG. 14 is the section XIV-XIV of FIG. 12.
Figure 15:
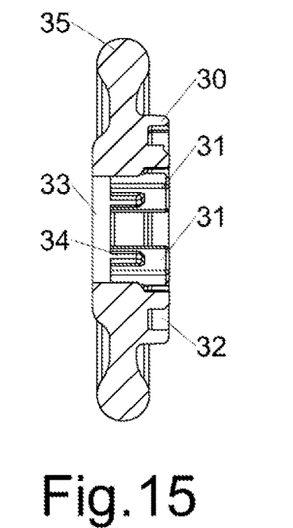
FIG. 15 is the section XV-XV of FIG. 12.
Figure 16:
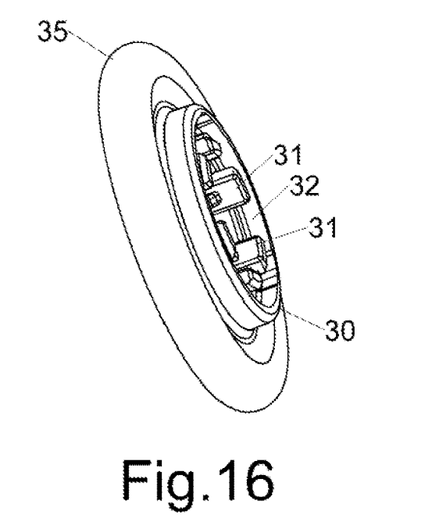
FIG. 16 is an axonometric view of the connection element of FIG. 12.

An auxiliary body 9 is fixed to the main body 1 and includes an auxiliary duct 10 connected to the main duct 2 to allow a flow of liquids between the auxiliary body 9 and the main body 1. The head 3a of the stem 3 and/or the main gasket 4 and/or the elastic means 6 are arranged in a chamber 11 arranged in turn between the main duct 2 and the auxiliary duct 10 to connect these two ducts. The chamber 11 can be obtained partially or completely in the main body 1 and/or in the auxiliary body 9.

The elastic means 6 preferably comprise a helical spring having a substantially frustoconical shape, wherein a rear end 3c, in particular having a substantially cylindrical and/or frustoconical shape, of the stem 3 is inserted into the smaller base of the conical frustum formed by the spring helical. The diameter of the major base of the spring 6 is substantially equal to the diameter of the chamber 11, which has a substantially cylindrical shape. Preferably, the front end of the helical spring 6 arranged around the rear end 3c of the stem 3 has an extension with a substantially cylindrical shape and a diameter smaller than the diameter of the external profile of the rear end 3c of the stem 3, so that the stem 3 is inserted with an interference and rigidly into the front end in the helical spring 6.

In the present embodiment, the chamber 11 is mainly made in the auxiliary body 9. The main gasket 4 is arranged in a seat 12 which is open towards the chamber 11 and is made in the main body 1 beside the mouth 2a of the main duct 2. A front end of the auxiliary body 9 can be arranged in a housing 13 made in the rear end of the main body 1. In an alternative embodiment, a rear end of the main body 1 can be arranged in a housing made in the front end of the auxiliary body 9.

The auxiliary body 9 is fixed to the main body 1 by means of extensions 20 engaged with protuberances 21 to prevent reciprocal axial movements between the main body 1 and the auxiliary body 9. In particular, the auxiliary body 9 is fixed to the main body 1 by means of six pairs of extensions 20 and protuberances 21 engaged with each other. In the present embodiment, the main body 1 comprises the extensions 20 and the auxiliary body 9 comprises the protuberances 21, or vice versa in an alternative embodiment, in which the main body 1 may comprise the protuberances 21 and the auxiliary body 9 may comprise the extensions 20. In the present embodiment, the extensions 20 protrude longitudinally from the main body 1 and the protrusions 21 protrude radially from the auxiliary body 9, or vice versa in an alternative embodiment, in which the extensions 20 may protrude longitudinally from the auxiliary body 9 and the protuberances 21 may project radially from the main body 1. The extensions 20 are engaged with the protuberances 21 by means of a tooth 22 which protrudes from an extension 20 and engages with a surface of a protuberance 21. The protuberances 21 are spaced apart from each other to form channels 23, in particular wider than the teeth 22 (a tooth 22 is shown with dashed lines in FIG. 9) of the extensions 20, so that a tooth 22 can pass between two protuberances 21 during mutual axial sliding, i.e. along the longitudinal axis A, of the main body 1 with respect to the auxiliary body 9, or vice versa, during the fixing of the main body 1 to the auxiliary body 9. The extensions 20 are spaced apart from each other to form a notch 24 between two extensions 20. Preferably, the channels 23 and the notches 24 have substantially the same width. Preferably, the protuberances 21 project radially less than the extensions 20, so as to allow a reciprocal rotation around the longitudinal axis A, of the main body 1 with respect to the auxiliary body 9, during the fixing of the main body 1 to the auxiliary body 9. In particular, the distance D1 between the inner surface of the extensions 20 and the longitudinal axis A is substantially equal, in particular slightly greater, than the distance between the outer surface of the protuberances 21 and the longitudinal axis A. The distance D1 is preferably greater than the distance D2 between the internal surface of the teeth 22 and the longitudinal axis A.

As also shown in FIGS. 12-16, a locking element is fixed to the main body 1 and/or to the auxiliary body 9 to prevent reciprocal movements between the main body 1 and the auxiliary body 9. In particular, the locking element comprises a collar 30 provided with a plurality of ribs 31 which project towards a central cavity 32 of the collar 30. Portions of the main body 1 and/or of the auxiliary body 9 are arranged in the central cavity 32 and/or in a central opening 33 of the collar 30 of the locking element. Preferably, a portion of the auxiliary body 9 is arranged in the central opening 33 of the collar 30, the ends of the extensions 20 with the teeth 22 are arranged in the central cavity 32 of the collar 30, and/or the ribs 31 of the collar 30 are arranged in the channels 23 and/or in the notches 24 of the main body 1 and/or of the auxiliary body 9, so that the blocking element, once inserted from the rear side of the dispenser around the auxiliary body 9, prevents the reciprocal rotation of the body main body 1 with respect to the auxiliary body 9 around the longitudinal axis A. The ribs 31 may comprise pads 34 in contact with surfaces of the main body 1 and/or of the auxiliary body 9, in particular with the outer surface of the auxiliary body 9, so as to create friction which slows down the sliding of the locking element with respect to the main body 1 and/or the auxiliary body 9. The collar 30 is partially or completely surrounded by a handle 35 having a substantially toroidal shape, for pulling or holding the dispenser with one hand. The collar 30 is in turn held in its final position by a retaining ring 36 inserted in a perimetric groove 37 obtained on the external surface of the auxiliary body 9. The perimetric groove 37 is preferably connected to a longitudinal groove 38 obtained on the external surface of the auxiliary body 9 to facilitate the removal of the retaining ring 36 from the auxiliary body 9, for example with the tip of a tool.

One or more auxiliary gaskets 40, 41 can be arranged between the main body 1 and the auxiliary body 9 to obtain a liquid tightness. A sleeve 42 and/or a bellows 43 can be arranged around the main body 1 and/or around the auxiliary body 9. The sleeve 42 can have a substantially cylindrical shape and is preferably made of metal. The bellows 43 can have a substantially frustoconical shape, with the major base facing the front side of the dispenser, and is preferably made of elastic material. The auxiliary body 9 is preferably made in one piece with a quick coupling 44, in particular of the male type, which protrudes from the rear side of the dispenser and comprises an internal duct 45 which is connected to the auxiliary duct 10, in particular it is aligned with the auxiliary duct 10 and has substantially the same diameter. A filter 46 suitable for filtering the liquids to be dispensed can be arranged in a recess 47 of the auxiliary body 9 and can comprise a tubular body closed by at least one filtering septum. The recess 47 is open towards the chamber 11, so that the filter 46 can be inserted into the recess 47 from the chamber 11. The filter 46 is preferably urged into the recess 47 by the elastic means 6. The filter 46 is preferably made of an elastic material to absorb any roughness of the elastic means 6.

An auxiliary gasket 48 may be disposed in the central cavity 32 of the collar 30 and presses against the sleeve 42 to hold the collar 30 and/or the sleeve 42 in their position, also when the sleeve 42 may expand during heating due to a sterilization of the dispenser. In particular, one end of the sleeve 42 is in contact with the auxiliary gasket 48 and the opposite end of the sleeve 42 abuts against a perimetric relief of the main body 1. The minor base of the bellows 43 is in contact with the collar 30, in so that the bellows 43 can be urged against the collar 30 during a compression of the bellows 43, for example due to the insertion of the dispenser into an opening of a cage for laboratory animals (not shown in the figures) and to the contact of the major base of the bellows 43 against the wall of the cage in which this opening is made.

The stem 3 can be arranged in a central hole 51 of a diaphragm 52 adapted to be arranged between the head 3a and the front end 3b of the stem 3. The diaphragm 52 is arranged in particular between the main body 1 and a cap 53, preferably made of metal, so that the diaphragm 52 is held in position. One or more auxiliary gaskets 54, 55 can be arranged between the main body 1 and the cap 53 to obtain a liquid tightness and to keep the cap 53 in its position, thanks to the friction with these gaskets.

Figures 17, 18, 19, 20, 21, 22:
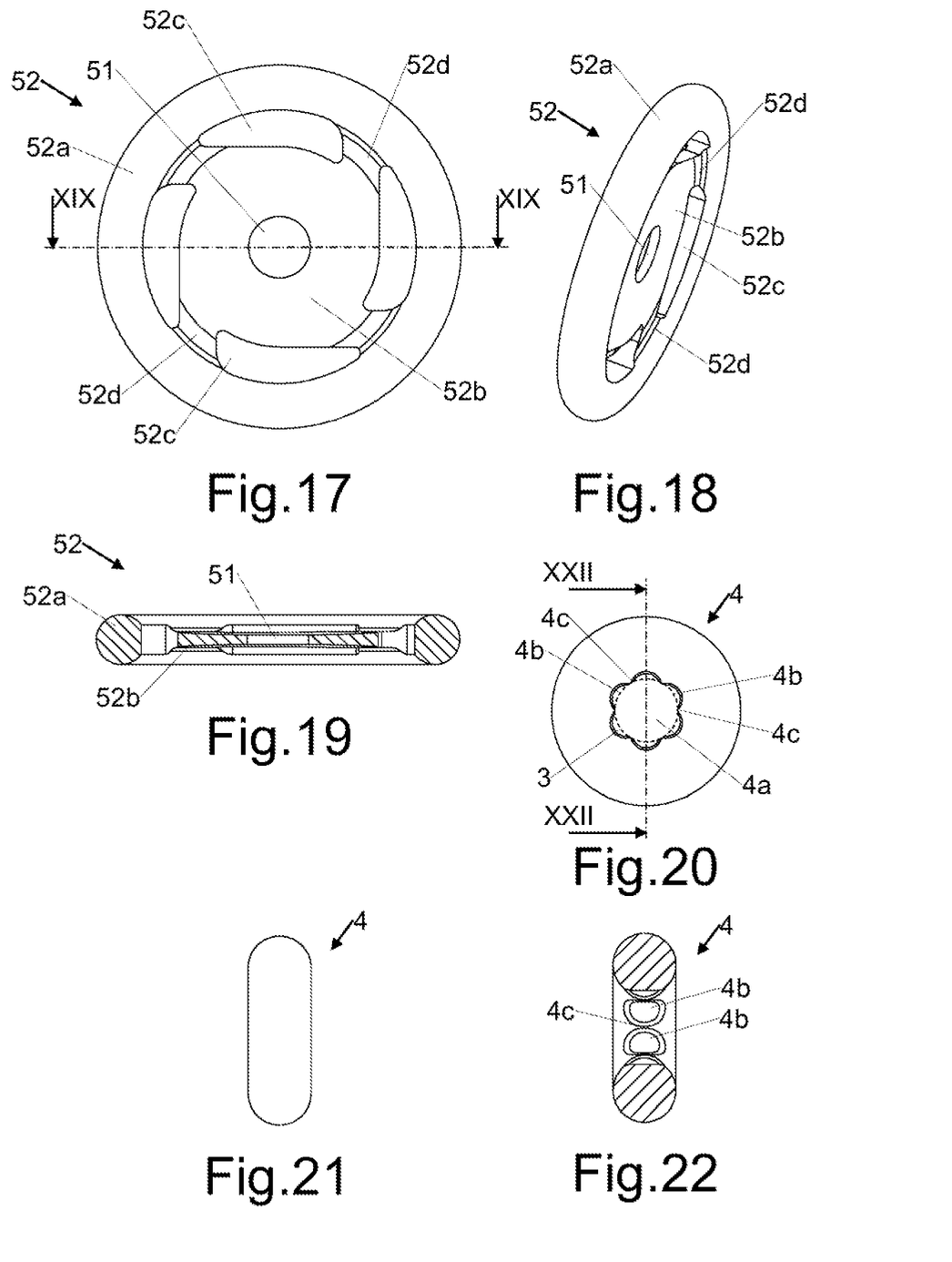
FIG. 17 is a front view of the diaphragm of the dispenser of FIG. 1.
FIG. 18 is an axonometric view of the diaphragm of FIG. 17.
FIG. 19 is the section XIX-XIX of FIG. 17.
FIG. 20 is a front view of the main seal of the dispenser of FIG. 1.
FIG. 21 is a side view of the main gasket of FIG. 20.
FIG. 22 is the section XXII-XXII of FIG. 20.
Figure 23:
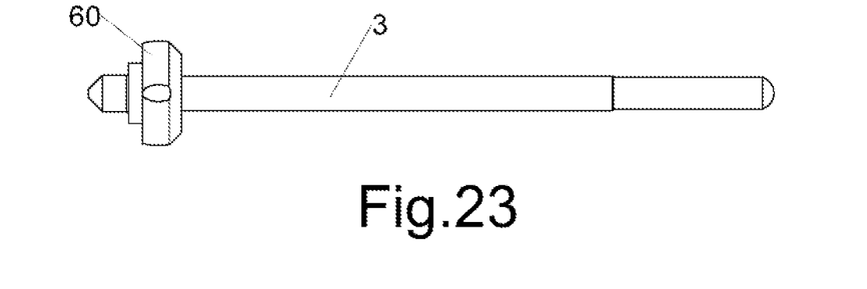
FIG. 23 is a side view of the stem of a second embodiment of the dispenser.
Figure 24:
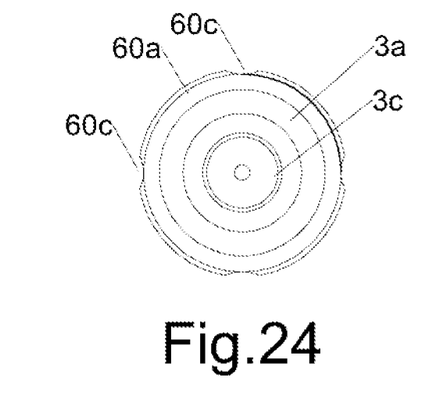
FIG. 24 is an enlarged rear view of the stem of FIG. 23.
Figure 25:
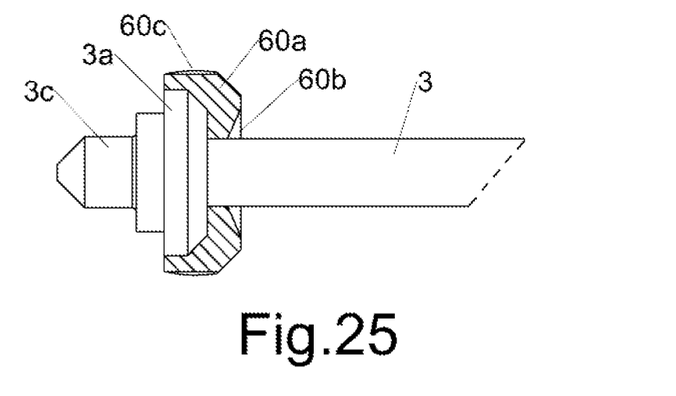
FIG. 25 is an enlarged and partially sectioned side view of the stem of FIG. 23.
Figure 26:
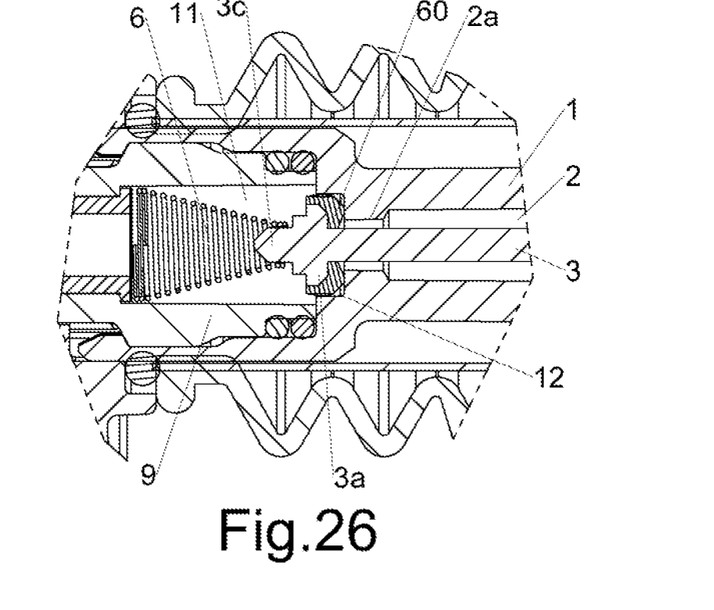
FIG. 26 is a partial view in longitudinal section of a second embodiment of the dispenser.

As also shown in FIGS. 17-19, the diaphragm 52 has a substantially discoidal shape with a peripheral portion 52a which surrounds a central portion 52b comprising the central hole 51. The peripheral portion 52a can have a substantially toroidal shape and the central portion 52b can have a substantially flat shape with a thickness that decreases towards the central hole 51. Openings 52c, in particular four openings 52c, are arranged between the peripheral portion 52a and the central portion 52b, so as to form spokes 52d arranged between two openings 52c and between the peripheral portion 52a and the central portion 52b. The openings 52c preferably comprise an outer edge having a substantially circular arc profile, in particular substantially concentric with the central hole 51, and an inner edge which has a curvilinear shape, wherein the distance between the inner edge and the outer edge of the openings 52c increases from one end of said arc to the other. In particular, the profile of the openings 52c has a substantially triangular shape with curved sides and rounded corners, as visible in FIG. 17. When the diaphragm 52 is arranged between the main body 1 and the cap 53, the openings 52c are closed by a surface of the main body 1 on one side of the diaphragm 52 and/or by a surface of the cap 53 on the opposite side of the diaphragm 52.

As also shown in FIGS. 20-22, the main gasket 4 has a substantially toroidal shape with a central hole 4a in which the stem 3 is arranged (shown with a dashed line in FIG. 20). The central hole 4a is provided with a plurality of recesses 4b, in particular six recesses 4b, which have a concave surface, in particular substantially cylindrical, facing the center of the central hole 4a, so that the stem 3 is in contact with the cusps 4c of the main gasket 4 which protrude between two recesses 4b towards the center of the central hole 4a.

As shown in FIGS. 23-26, a second embodiment of the dispenser is similar to the first embodiment but comprises a main gasket 60 which comprises a hollow portion which at least partially houses the head 3a of the stem 3. The gasket 60 is preferably joined to the stem 3, in particular it is printed directly on the head 3a. The main gasket 60 also comprises a substantially convex peripheral portion 60a, which faces the seat 12 in the main body 1, and a substantially concave central portion 60b, which faces the mouth 2a of the main duct 2. The main gasket 60 can furthermore comprise a plurality of longitudinal grooves 60c formed along the outer edge of the peripheral portion 60a.

Preferably, the main body 1, the main duct 2, the stem 3, the main gasket 4 or 60, the elastic means 6, the auxiliary body 9, the auxiliary duct 10, the chamber 11, the seat 12, the housing 13, the collar 30, the handle 35, the sleeve 42, the bellows 43, the coupling 44, the internal duct 45, the filter 46, the recess 47, the diaphragm 52 and/or the cap 53 are substantially coaxial and/or substantially symmetrical to the longitudinal axis A, while the extensions 20, the protuberances 21, the ribs 31, the pads 34 and/or the longitudinal groove 38 are substantially parallel to the longitudinal axis A.

Variations or additions can be made by those skilled in the art to the embodiments described and illustrated herein while remaining within the scope of the following claims. In particular, further embodiments may comprise the technical features of one of the following claims with the addition of one or more technical features described in the specification or illustrated in the drawings, taken individually or in any reciprocal combination and including their equivalent features.

The terms "a/an/one", "two", etc. in the description and in the claims mean respectively "at least one", "at least two", etc., unless otherwise specified. Similarly, angles, proportions and values mentioned in the text and/or shown in the drawings include a tolerance of at least 5%, again unless otherwise specified.

What is claimed:

1. A liquid dispenser for watering animals, which comprises a main body including a main duct, wherein the main body develops along a longitudinal axis from a rear side to a front side of the dispenser, wherein an animal can drink, from the front side of the liquid dispenser, liquids dispensed through the main duct, wherein a stem is arranged in the main duct and includes a head urged by elastic means towards the main duct, wherein an auxiliary body is fixed to the main body and includes an auxiliary duct, wherein the head of the stem and the elastic means are arranged in a chamber connecting the main duct with the auxiliary duct, wherein the auxiliary body is fixed to the main body by means of extensions engaged with protuberances to prevent reciprocal axial movements between the main body and the auxiliary body, wherein the protuberances are spaced apart to form channels and the extensions are spaced apart to form notches, each notch being comprised between two extensions, wherein a locking element is fixed to the main body and/or to the auxiliary body, wherein the locking element comprises a collar provided with a plurality of ribs which are arranged in the channels and/or in the notches to prevent mutual rotations around the longitudinal axis of the main body with respect to the auxiliary body.

2. The liquid dispenser according to claim 1, wherein the main body comprises the extensions and the auxiliary body comprises the protuberances, or vice versa.

3. The liquid dispenser according to claim 1, wherein the extensions protrude longitudinally from the main body and the protuberances protrude radially from the auxiliary body, or vice versa.

4. The liquid dispenser according to claim 1, wherein the ribs of the collar protrude towards a central cavity of the collar, wherein portions of the main body and/or of the auxiliary body are arranged in the central cavity and in a central opening of the collar.

5. The liquid dispenser according to claim 1, wherein the ribs comprise pads in contact with surfaces of the main body and/or of the auxiliary body, so as to create a friction which slows down the axial sliding of the locking element with respect to the main body and/or to the auxiliary body.

6. The liquid dispenser according to claim 1, wherein the elastic means comprise a helical spring having a substantially frustoconical shape, wherein a rear end of the stem is inserted in a minor base of a frustum formed by the helical spring.

7. The liquid dispenser according to claim 6, wherein a front end of the helical spring which is arranged around the rear end of the stem has an extension having a substantially cylindrical shape and a diameter smaller than the diameter of an outer profile of the rear end of the stem, so that the stem is inserted with interference and rigidly into the front end in the helical spring.

8. The liquid dispenser according to claim 1, wherein the auxiliary body is made in one piece with a quick coupling which protrudes from the rear side of the dispenser and comprises an inner duct connected to the auxiliary duct.

9. The liquid dispenser according to claim 1, wherein a filter suitable to filter the liquids to be dispensed is arranged in a recess of the auxiliary body, wherein the recess is open towards the chamber, so that the filter can be inserted into the recess from the chamber.

10. The liquid dispenser according to claim 1, wherein the collar is partially or completely surrounded by a handle.

11. The liquid dispenser according to claim 1, wherein the stem is arranged in a central hole of a diaphragm which has a substantially discoidal shape with a perimeter portion surrounding a central portion comprising the central hole, wherein openings are arranged between the perimeter portion and the central portion, so as to form spokes arranged between two openings and between the perimeter portion and the central portion.

12. The liquid dispenser according to claim 11, wherein the openings of the diaphragm comprise an outer edge having a circular arc profile and an inner edge having a curvilinear shape, wherein the distance between the inner edge and the outer edge of the openings increases from one end of said circular arc profile to the other.

13. The liquid dispenser according to claim 11, wherein the diaphragm is arranged between the main body and a cap, wherein the openings of the diaphragm are closed by a surface of the main body on one side of the diaphragm and/or by a surface of the cap on the opposite side of the diaphragm.

14. The liquid dispenser according to claim 1, wherein a main gasket is arranged between the head of the stem and the main duct, wherein the main gasket has a substantially toroidal shape with a central hole in which the stem is arranged, wherein the central hole is provided with a plurality of recesses which have a concave surface facing the center of the central hole, so that the stem is in contact with cusps of the main gasket, wherein each cusp protrudes between two recesses towards the center of the central hole.

15. The liquid dispenser according to claim 1, wherein a main gasket is arranged between the head of the stem and the main duct, wherein the main gasket comprises a substantially convex peripheral portion, a substantially concave central portion facing the main duct, as well as a hollow portion which at least partially houses the head of the stem.

16. The liquid dispenser according to claim 1, wherein the main body, the main duct, the stem, the elastic means, the auxiliary body, the auxiliary duct, the chamber and/or the collar are substantially coaxial and/or substantially symmetrical with respect to the longitudinal axis.

17. The liquid dispenser according to claim 1, wherein the extensions, the protuberances and/or the ribs are substantially parallel to the longitudinal axis.

18. The liquid dispenser according to claim 8, wherein the quick coupling and/or the inner duct are substantially coaxial and/or substantially symmetrical with respect to the longitudinal axis.

19. The liquid dispenser according to claim 13, wherein the diaphragm and/or the cap are substantially coaxial and/or substantially symmetrical with respect to the longitudinal axis.

20. The liquid dispenser according to claim 14, wherein the main gasket and/or a seat of the main gasket are substantially coaxial and/or substantially symmetrical with respect to the longitudinal axis.

\* \* \* \* \*